United States Patent [19]

Beauvir

[11] Patent Number: 5,201,492
[45] Date of Patent: Apr. 13, 1993

[54] METAL DIAPHRAGM FOR DIAPHRAGM-TYPE VALVE

[75] Inventor: Jacques Beauvir, Chez-Le-Bart, Switzerland

[73] Assignee: Transfluid SA, Saint Aubin, Switzerland

[21] Appl. No.: 895,117

[22] Filed: Jun. 8, 1992

[30] Foreign Application Priority Data

Jun. 7, 1991 [FR] France .................. 91 07192

[51] Int. Cl.⁵ .................................. F16K 7/16
[52] U.S. Cl. .................. 251/331; 92/103 M
[58] Field of Search ............... 251/331, 334; 92/103 M

[56] References Cited
U.S. PATENT DOCUMENTS
1,410,205  3/1922  Madigan .................. 251/331

FOREIGN PATENT DOCUMENTS
892076 10/1953 Fed. Rep. of Germany ... 92/103 M
465218  8/1951 France .................. 251/331

Primary Examiner—Arnold Rosenthal
Attorney, Agent, or Firm—Oliff & Berridge

[57] ABSTRACT

A metal diaphragm used in making valves designed for passage of highly pure liquids has, starting at an outer periphery, an outer collar designed to abut a planar base of a valve in sealing fashion and connected to a central part, on which an actuating device of the valve is designed to act, by several annular surfaces stepped upward from a plane in which the diaphragm abuts the base. The annular surfaces are successively inclined from the periphery to the central part. One of the annular surfaces is parallel to the plane in which the diaphragm abuts the base when no force is exerted on the diaphragm.

11 Claims, 2 Drawing Sheets

METAL DIAPHRAGM FOR DIAPHRAGM-TYPE VALVE

BACKGROUND OF THE INVENTION

The subject of the present invention is a metal diaphragm for a diaphragm-type valve.

In known fashion, a diaphragm-type valve has a body in which are provided fluid inlet and discharge channels, whereby the inlet channel terminates in a face opposite which the diaphragm is mounted. The diaphragm, by deformation, is able to isolate or place in communication the fluid inlet and discharge channels by blocking or unblocking the end of the fluid inlet channel which forms a seat for the diaphragm.

It is useful to employ diaphragm-type valves when excellent sealing properties as well as elimination of contamination of the fluid transported are desired, particularly by minimizing the microparticles that might detach from the components of the valve, and when the goal is to minimize gap zones that are incompatible with the use of pure fluid, in view of the small-volume cavities that these zones delimit, where particles may accumulate, and where they may detach at any moment in time. Moreover, in these gap zones, quantities, even small quantities, of residual fluid may remain, which cannot be eliminated by flushing. If these fluids have aggressive chemical properties, these retention zones increase the likelihood of corrosion.

A diaphragm-type valve has, by comparison with a bellows-type valve, the advantage of limiting the gap zones, and avoiding losses of microparticles of material. Also, the diaphragm must not be associated with an actuating element such as a spring located in the fluid channel, as this is also likely to release damaging particles.

A first solution consists of using a plane diaphragm. Such a diaphragm type is not entirely satisfactory since the travel between the closed position and the open position of the valve is short, so that the flow coefficient is also limited. Moreover, in the peripheral zone in which the diaphragm is attached to the base of the valve, the material creeps, resulting in leaks at the point of attachment.

One solution which initially would appear to be attractive consists of using a corrugated diaphragm which allows the flexibility as well as the travel of the diaphragm to be increased. However, experience shows that the corrugations in the diaphragm stiffen it, and leave dead spaces inside the corrugations which form fluid retention zones.

SUMMARY OF THE INVENTION

A goal of the invention is to supply a metal diaphragm for a diaphragm-type valve, which provides closure under excellent sealing conditions, and in particular passes a helium leak test of $2 \times 10^{-9}$ cm$^3$/second, which valve is actuated only into the closed position by an actuating device, and which changes to the open position by itself in view of its shape as soon as the actuating device ceases to act, offering a very large flow coefficient. This diaphragm must withstand corrosion by aggressive fluids of the type used in microelectronics, have a long lifetime, minimize the gap zones and dead spaces, and be attachable to the base of the valve either mechanically or by welding.

For this purpose, the metal diaphragm to which the invention relates is in the form of a disk and, starting from its periphery, has an outer collar designed to abut a base of a valve along a plane in sealing fashion and connected to a central part, on which an actuating device will act, by several annular surfaces stepped from the plane in which the diaphragm abuts the base toward the outside. These annular surfaces are successively inclined from the periphery of the diaphragm to a center thereof, and are parallel to the plane in which the diaphragm abuts the base, when no force is exerted on the diaphragm.

This diaphragm, made of an alloy which renders the material fully nonoxidizable, has a very low elasticity modulus. However, the design of this diaphragm allows it to be attached very firmly at the outer collar, and allows substantial deformation under the influence of a slight force, due to the stepped design, allowing a high flow coefficient to be obtained in the open position of the valve.

It should be noted that the metal stresses due to deformation of the diaphragm are not transmitted to the outer collar, serving for attachment to the base of the valve, because of the rigidity obtained at the level of this collar by means of the inclined part adjacent thereto forming a lever arm. The point where the diaphragm abuts an upper edge of this inclined part acts as a flying buttress and, during closing of the diaphragm, allows slight flexing, ensuring deformation of an entire zone located inside relative to this edge, as well as return of the diaphragm to the open position when the action exerted by the actuating device ceases.

BRIEF DESCRIPTION OF THE DRAWINGS

The invention will be thoroughly understood with the aid of the description hereinbelow which refers to the attached schematic diagrams representing, as a non-limiting example, one embodiment of this diaphragm and a valve equipped therewith.

DETAILED DESCRIPTION OF PREFERRED EMBODIMENTS

Figure 1:
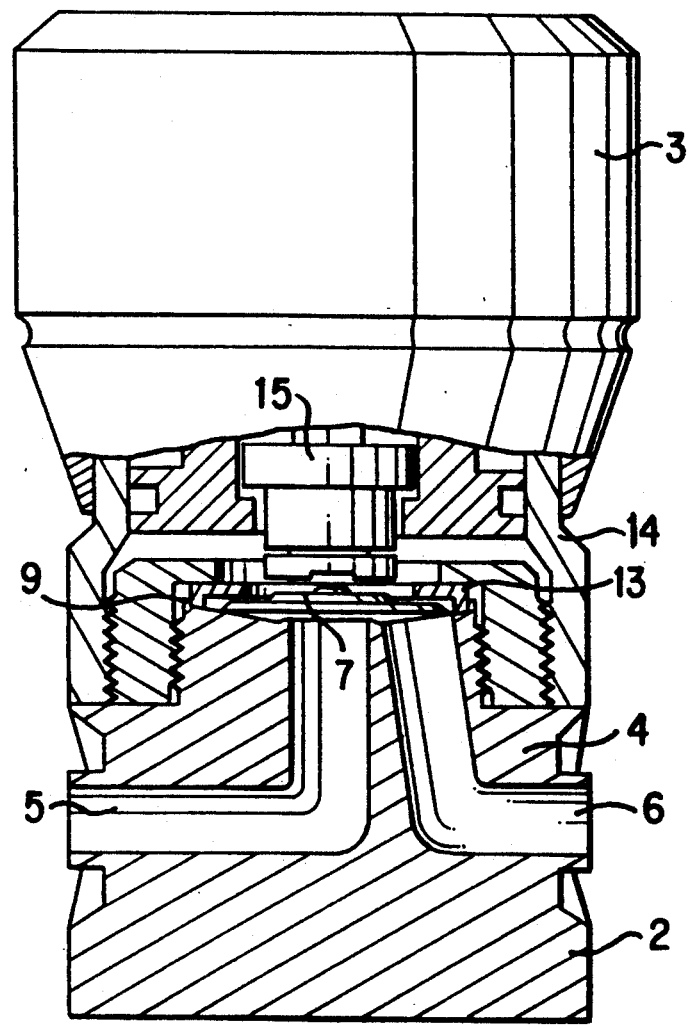
FIG. 1 is a lengthwise section through a valve equipped with a diaphragm.
Figure 2:
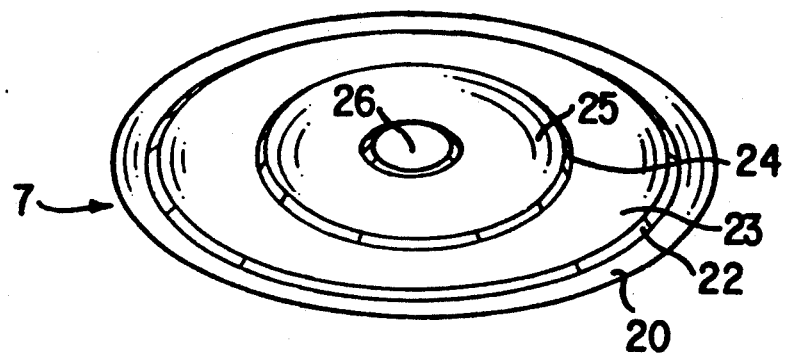
FIG. 2 is a perspective view of a diaphragm according to the invention.

Advantageously, at rest and before mounting on the base, the outer collar forms an angle elevated several degrees relative to the plane in which it abuts the base.

This being the case, when the diaphragm is "squeezed" at its outer collar, an edge delimiting the collar and the inclined part rest on the plane face of the base, and the pressure exerted at this edge limits the gaps that constitute fluid retention zones. Moreover, the mechanical forces on the collar are rendered horizontal, and increase the advantage of the lever arm of the adjacent inclined part.

The dynamics achieved by this arrangement are about six times those of a corresponding plane diaphragm. The flexibility is greatly enhanced and provides excellent sealing conditions.

According to one characteristic of the invention, the outer collar is extended on the inner side by a frustroconical surface forming the inclined part, itself extended by a surface parallel to the plane of abutment of the base, when the diaphragm is at rest.

Since the diaphragm is attached mechanically, this annular surface parallel to the plane of abutment of the base is in contact with a corresponding face of a tightening washer when the diaphragm is in the open position.

According to one embodiment, the surface parallel to the plane of abutment on the base is extended by a second inclined part in the vicinity of the actuating device, the second inclined part being connected to the central part of the diaphragm.

Advantageously, the second inclined part connecting the central part to the surface parallel to the plane of abutment of the base is bent and has its concave surface facing the outside of the diaphragm.

The latter arrangement allows the diaphragm to flex over the entire zone between the first inclined part connected directly to the outer collar, and the central part forming a plug, and actuated by the piston of the actuating device. In view of the flexibility of the assembly, and the lack of attachment between the piston and the outer face of the diaphragm, the latter has free play, which considerably prolongs its lifetime. It should be noted that the washer mentioned above, which the diaphragm abuts in the open position of the valve, allows the shape of this diaphragm to be retained even if the fluid pressure is very high, which is conducive to improving sealing and to increasing the lifetime of the diaphragm by preventing it from undergoing excessive deformations. The reliability of the valve assembly is thus reinforced.

According to another characteristic of the invention, this diaphragm has at its center an elevation with a diameter that is small by comparison with the diameter of the central part, which is itself greater than the diameter of a seat provided at the end of the channel to be blocked, resulting from outward deformation of the diaphragm, while the piston of the actuating device has a matching depression designed to receive this elevation when the piston is in contact with the diaphragm.

This elevation stiffens the central part, which favors a good contact thereof with the seat provided on the base. Moreover, this stiffening is considerable since it is this central part which receives the pressure of the actuating device. Finally, the depression, facing the inside face of the diaphragm, matching the elevation protruding from the outside face of the diaphragm, also contributes to improving the flow coefficient of the valve.

Advantageously, in order to improve the sealing performance of the diaphragm, the piston of the actuating device, which has a larger diameter than that of the seat with which the sealing action must be brought about, has in a plane parallel to that in which its face abuts the diaphragm, a peripheral recess delimiting at the center a thickness of material with a diameter smaller than that of the seat of the valve relative to which the sealing action must be brought about.

This arrangement confers on the system a certain flexibility when the diaphragm is applied to the seat by means of the piston, It is thus possible to compensate for slight irregularities in planeness or geometry, since the diaphragm thus tends to creep toward the inside of the orifice to be blocked. This arrangement allows an excellent seal to be provided, while employing a piston made of a rigid material. It should be noted that the use of an overly flexible material for making the piston not only does not produce a good seal but also irreversibly and injuriously deforms the diaphragm.

The valve shown in the drawing has a base 2 surmounted by an operating button 3. Base 2 has a body 4 in which is provided a fluid inlet channel and a fluid discharge channel, terminating in one surface of body 4 opposite which a metal diaphragm 7 is mounted. The surface of the base on which the metal diaphragm rests has an outer surface 8 in the shape of a plane crown, surrounded by a tubular peripheral rim 9. In the embodiment shown in the drawing, the face of the body of the base into which channels 5 and 6 lead has a conical depression 10 in the center of which terminates channel 5 which is surrounded by a rounded rib 12 forming a seat for the diaphragm. This arrangement for the base is provided as a nonlimiting example, it being specified that depression 10 could be nonexistent or seat 12 could be made differently.

To the body 4 of the base is screwed a ring 13 on which is mounted body 14 of the valve actuating device whose piston 15 is shown in the drawing. This ring 13 also abuts a washer 16 which has a shoulder 17 designed to attach the diaphragm to plane crown 8 of the base, and a return 18 which rests on part of the outer face of the diaphragm. This washer 16, like ring 13, has a central opening for passage of piston 15 of the diaphragm actuating device.

The diaphragm has, from the outside to the inside, an attachment zone 20 in the shape of a collar designed to rest on crown 8 of the base, a frustroconical surface 22, an annular surface 23 parallel to the plane in which the diaphragm abuts the base, coming in contact in the resting position with washer 16, an inclined surface 24 which is curved, and whose concave surface faces outward, and a central part 25 forming a plug and on which piston 15 acts.

This central part 25 has an elevation 26 at its center, facing outward and obtained by embossing. This elevation stiffens the central part.

For its part, piston 15 has an end 27 made for example of a very hard synthetic material, having a central depression 28 to accommodate the elevation 26, as well as an annular recess 29 provided in a plane parallel to the plane containing the face abutting the diaphragm. This recess 29 delimits, in the center of end 27 of the piston, a thickness of material with a diameter less than that of seat 12.

Figure 3:
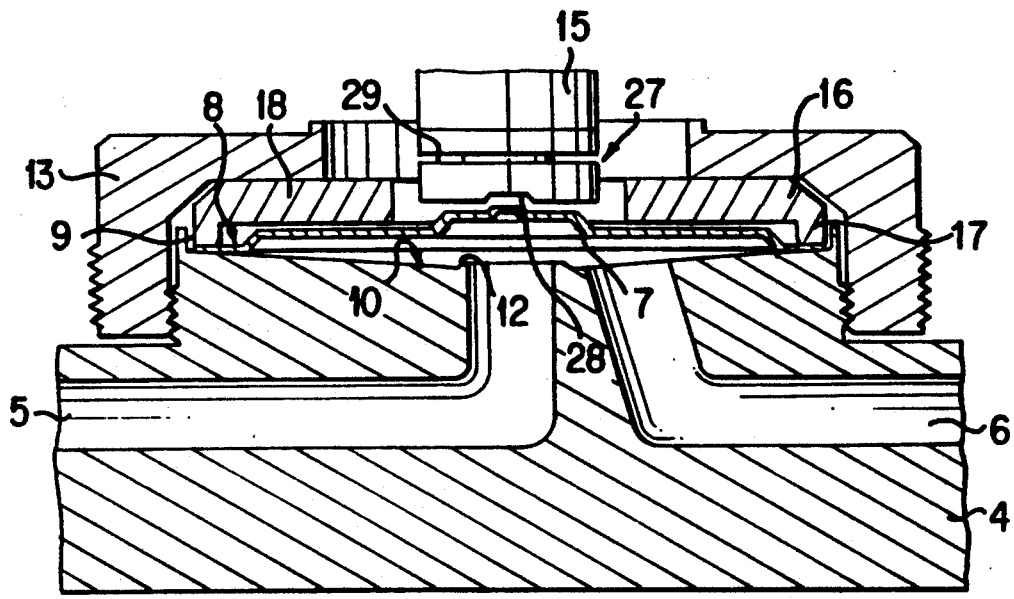
FIGS. 3 and 4 are two views in lengthwise section of the diaphragm in FIG. 2 mounted on a valve base, in the open and closed positions respectively.
Figure 4:
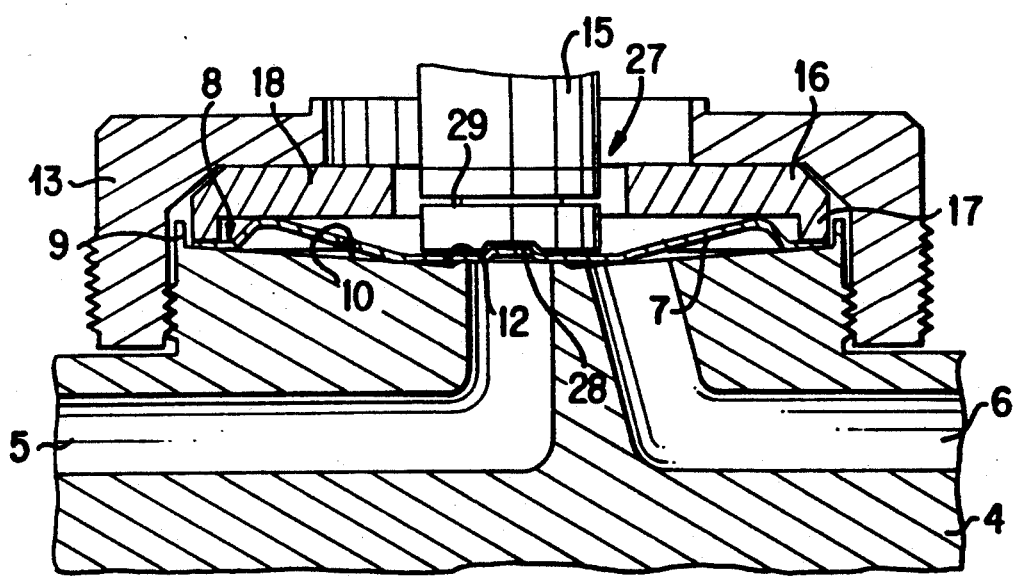

FIGS. 3 and 4 show a valve equipped with this diaphragm. In FIG. 3, the valve is in the open position, which perfectly shows the broad passage offered to the fluid, as well as the smallness of the gap zones. FIG. 4 shows the valve in the closed position. As can be seen from this figure, inclined surface 22 acts like a flying buttress and, by flexing slightly, allows deformation of the entire zone constituted by surfaces 23 and 24, as well as return thereof to the open position when the piston rises. It is also of interest to note that in the closed position of the valve, the dead zones are extremely limited.

It goes without saying that the invention is not limited to the single embodiment of this diaphragm or its single application described above as examples, but covers all variants thereof.

Thus, for example, the number of successive steps of the diaphragm may be different, this diaphragm could be welded to the base, the fluid discharge channel could not fail to terminate, or the shape of the base could be different, without thereby departing from the framework of the invention.

What is claimed is:

1. A metal diaphragm having a top side and a bottom side for use with a diaphragm-type valve having a base extending in a plane, said diaphragm being in the form of a disk having an outer collar located on an outer periphery of said disk designed to abut the base in sealing fashion and connected to a central part of the diaphragm, on which an actuating device is designed to act, by a plurality of annular surfaces stepped away from the plane in which the diaphragm abuts the base, said annular surfaces being successively inclined from said outer collar to said central part of said diaphragm, one of said annular surfaces being parallel to said plane when no force is exerted on said diaphragm.

2. The metal diaphragm of claim 1, wherein said outer collar forms an angle elevated several degrees relative to the plane in which it abuts the base while at rest and before mounting on the base.

3. The metal diaphragm of claim 1, wherein said outer collar is extended on an inner side by a frustoconical surface which is extended by a surface parallel to the plane of abutment when the diaphragm is at rest.

4. The metal diaphragm of claim 3, wherein said surface parallel to the plane of abutment is extended by an inclined zone which is connected to said central part of said diaphragm.

5. The metal diaphragm of claim 4, wherein said inclined zone connecting said central part to said surface parallel to the plane of abutment is bent and has a concave surface facing said top side of said diaphragm.

6. The metal diaphragm of claim 1, wherein said central part has a diameter and comprises an elevation having a diameter substantially smaller than said diameter of said central part.

7. A metal diaphragm and valve assembly, comprising:

a valve body having a base and a channel, said channel having an outlet including a seat of a predetermined diameter and said base extending in a plane;

an actuating device movably positioned within said valve body to actuate a diaphragm, said actuating device including a piston; and a metal diaphragm in the form of a disk including an outer collar located on an outer periphery of said disk designed to abut said base in the plane in sealing fashion and connected to a central part of the diaphragm by a plurality of annular surfaces stepped away from the plane in which the diaphragm abuts the base, said annular surfaces being successively inclined from said outer collar to said central part of said diaphragm, one of said annular surfaces being parallel to said plane when no force is exerted on said diaphragm.

8. The diaphragm and valve assembly of claim 7, wherein said central part has a diameter and comprises an elevation having a diameter substantially smaller than said diameter of said central part, said central part diameter being greater than said seat diameter and said piston of said actuating device has a matching depression which receives said elevation when said piston is in contact with said diaphragm.

9. The diaphragm and valve assembly of claim 7, wherein said piston has a larger diameter than said seat.

10. The diaphragm and valve assembly of claim 9, wherein said piston of said actuating device has, in a plane parallel to the abutment plane, a peripheral recess delimiting at a center of said piston, a portion of said piston with a diameter smaller than said seat diameter.

11. The diaphragm and valve assembly of claim 7, wherein said valve body includes a washer having a shoulder which retains said outer collar to said body and a planar return, said planar return being parallel with said abutment plane.

* * * * *